(12) United States Patent
Morelli, Jr.

(10) Patent No.: US 9,191,445 B2
(45) Date of Patent: Nov. 17, 2015

(54) SYSTEMS AND METHODS FOR MANAGING EMULATION SESSIONS

(71) Applicant: Sphere 3D Inc., Mississauga (CA)

(72) Inventor: Giovanni Morelli, Jr., Toronto (CA)

(73) Assignee: Giovanni Morelli, Mississauga, Ontario (CA)

( * ) Notice: Subject to any disclaimer, the term of this patent is extended or adjusted under 35 U.S.C. 154(b) by 274 days.

(21) Appl. No.: 13/742,632

(22) Filed: Jan. 16, 2013

(65) Prior Publication Data

US 2013/0185448 A1    Jul. 18, 2013

(30) Foreign Application Priority Data

Jan. 16, 2012   (CA) .................................... 2764362

(51) Int. Cl.
*G06F 13/00* (2006.01)
*H04L 29/08* (2006.01)

(52) U.S. Cl.
CPC .............. *H04L 67/141* (2013.01); *H04L 67/08* (2013.01)

(58) Field of Classification Search
CPC .............. G06F 9/4445; G06F 9/45558; G06F 9/45533; B03C 1/26; B03C 1/284; B03C 1/08; B03C 1/005; B03C 1/04; H04L 67/141; H04L 67/08
USPC ........................................................ 709/228
See application file for complete search history.

(56) References Cited

U.S. PATENT DOCUMENTS

| 5,341,477 A | 8/1994 | Pitkin et al. |
| 5,748,890 A | 5/1998 | Goldberg et al. |
| 6,750,885 B1 | 6/2004 | Finch et al. |
| 7,007,093 B2 | 2/2006 | Spicer et al. |
| 7,219,234 B1 | 5/2007 | Ashland et al. |
| 7,434,257 B2 | 10/2008 | Garg et al. |

(Continued)

FOREIGN PATENT DOCUMENTS

| EP | 998705 | 10/1997 |
| JP | 200057091 | 2/2005 |

OTHER PUBLICATIONS

How to redirect to a certain URL if a page returns an "access denied" message? Posted by DrupalCuckoo on Jul. 12, 2010 at 10:39am https://groups.drupal.org/node/50154.

(Continued)

*Primary Examiner* — Robert B Harrell
(74) *Attorney, Agent, or Firm* — Bereskin & Parr LLP/S.E.N.C.R.L., s.r.l.

(57) ABSTRACT

A method and system for managing an emulation session of a computer product. The method and system involves receiving a request from a user device to establish the emulation session; establishing an electronic communication link between the user device and an emulation server for providing the emulation session to the user device; operating at least one server processor, the at least one server processor being in electronic communication with the user device and the emulation server and being separate from the user device processor, to determine emulation session data based on the received request and by monitoring the emulation session; to determine a plurality of emulation session parameters based on the received request; to determine a session action to be applied to the emulation session based on the plurality of emulation session parameters and the emulation session data; and to control the emulation session based on the session action.

28 Claims, 3 Drawing Sheets

(56) References Cited

U.S. PATENT DOCUMENTS

| | | | |
|---|---|---|---|
| 7,568,217 B1 | 7/2009 | Prasad et al. | |
| 7,580,826 B2* | 8/2009 | Vega et al. | 703/24 |
| 7,870,256 B2* | 1/2011 | Talwar et al. | 709/226 |
| 8,028,040 B1* | 9/2011 | Hobbs et al. | 709/219 |
| 8,141,075 B1* | 3/2012 | Chawla et al. | 718/1 |
| 8,175,863 B1* | 5/2012 | Ostermeyer et al. | 703/22 |
| 8,347,288 B1* | 1/2013 | Brandwine | 718/1 |
| 8,453,145 B1* | 5/2013 | Naik | 718/1 |
| 8,555,274 B1* | 10/2013 | Chawla et al. | 718/1 |
| 8,572,613 B1* | 10/2013 | Brandwine | 718/100 |
| 8,707,397 B1* | 4/2014 | Wilkinson et al. | 726/4 |
| 2005/0132220 A1 | 6/2005 | Chang et al. | |
| 2006/0190238 A1* | 8/2006 | Autor et al. | 703/25 |
| 2007/0130305 A1* | 6/2007 | Piper et al. | 709/223 |
| 2010/0269046 A1* | 10/2010 | Pahlavan et al. | 715/740 |
| 2010/0299436 A1* | 11/2010 | Khalid et al. | 709/226 |
| 2011/0018883 A1* | 1/2011 | Sampath et al. | 345/522 |
| 2011/0055602 A1* | 3/2011 | Kamay et al. | 713/320 |
| 2011/0145574 A1 | 6/2011 | Ju et al. | |
| 2011/0153716 A1* | 6/2011 | Malakapalli et al. | 709/203 |
| 2011/0246904 A1* | 10/2011 | Pinto et al. | 715/740 |
| 2011/0265009 A1* | 10/2011 | Eby et al. | 715/740 |
| 2012/0089980 A1* | 4/2012 | Sharp et al. | 718/1 |
| 2012/0110571 A1* | 5/2012 | Smith et al. | 718/1 |
| 2012/0297455 A1 | 11/2012 | Novak et al. | |
| 2013/0055102 A1* | 2/2013 | Matthews et al. | 715/740 |
| 2013/0060837 A1* | 3/2013 | Chakraborty et al. | 709/203 |
| 2013/0076768 A1* | 3/2013 | Chakraborty et al. | 345/543 |
| 2013/0104125 A1* | 4/2013 | Sarma et al. | 718/1 |

OTHER PUBLICATIONS

International Search Report and Written Opinion dated Jul. 11, 2014, International Application No. PCT/CA2014/000301.

Microsoft, "Remote Desktop Protocol", Retrieved from the Internet: URL: msdn.microsoft.com/en-ca/library/windows/desktop/aa383015(v=vs.85).aspx [retrieved on Apr. 8, 2013].

Microsoft, "Virtual Desktop Infrastructure", Retrieved from the Internet: URL: www.microsoft.com/en-us/servercloud/windows-server/virtual-desktop-infrastructure.aspx [retrieved on Apr. 8, 2013].

Microsoft, "Remote Desktop Services in Windows Server 2008 R2", Retrieved from the Internet: URL: technet.microsoft.com/library/dd647502(WS.10).aspx [retrieved on Apr. 8, 2013].

Microsoft, "Microsoft Hyper-V Server 2012", Retrieved from the Internet: URL: www.microsoft.com/en-us/server-cloud/hyper-v-server/default.aspx [retrieved on Apr. 8, 2013].

Microsoft, "Virtualization Desktop Infrastructure, Windows Server 2012", Retrieved from the Internet: URL: download.microsoft.com/download/F/E/D/FED8C1A8-B146-4434-BE2E-A82CA9F26079/WS%202012%20White%20Paper_VDI.pdf [retrieved on Apr. 8, 2013].

Microsoft, "Why Hyper-V?", Retrieved from the Internet: URL: download.microsoft.com/download/5/7/8/578E035F-A1A8-4774-B404-317A7ABCF751/Competitive-Advantages-of-Hyper-V-Server-2012-over-VMware-vSphere-Hypervisor.pdf [retrieved on Apr. 8, 2013].

Response to Advisory Action dated Apr. 16, 2015, U.S. Appl. No. 13/742,585.

Advisory Action dated Apr. 16, 2015, U.S. Appl. No. 13/742,585.

Response to Office Action dated Jan. 14, 2015, U.S. Appl. No. 13/742,585.

Office Action dated Jan. 14, 2015, U.S. Appl. No. 13/742,585.

Response to Office Action dated Jun. 23, 2014, U.S. Appl. No. 13/742,585.

Office Action dated Jun. 23, 2015, U.S. Appl. No. 13/742,585.

Interview Summary dated May 29, 2015, U.S. Appl. No. 13/742,585.

Preliminary Amendment dated Jun. 10, 2015, U.S. Appl. No. 13/742,585.

* cited by examiner

SYSTEMS AND METHODS FOR MANAGING EMULATION SESSIONS

This application claims foreign priority to Canadian Patent Application No. 2,764,362, filed on Jan. 16, 2012.

FIELD

The described embodiments relate to systems and methods for managing emulation sessions.

BACKGROUND

An emulation system operates to imitate a computer product in an emulation session. The emulation system can facilitate the emulation by translating and processing instructions into a format compatible with the emulated computer product. A system on which the emulator operates can be referred to as a host computer or an emulation server.

Common emulation systems include Microsoft™ Remote Desktop Services. The Remote Desktop Services operate based on the remote desktop protocol (RDP) to provide a graphical interface to a user device over a network connection. However, there are few tools that monitor and control RDP sessions.

Accordingly, there is a need for management and control of emulation sessions provided by emulation systems.

SUMMARY

In accordance with an embodiment of the invention, there is provided a method for managing an emulation session of a computer product. The method comprises: receiving a request from a user device to establish the emulation session, the user device includes a user device processor; establishing an electronic communication link between the user device and an emulation server for providing the emulation session to the user device; operating at least one server processor, the at least one server processor being in electronic communication with the user device and the emulation server and being separate from the user device processor, to determine emulation session data based on the received request and by monitoring the emulation session; to determine a plurality of emulation session parameters based on the received request; to determine a session action to be applied to the emulation session based on the plurality of emulation session parameters and the emulation session data; and control the emulation session based on the session action.

In accordance with an embodiment of the invention, there is provided a system for managing an emulation session of a computer product. The emulation session being provided by an emulation server to a user device with a user device processor. The system comprises: an administrator module comprising an administrator processor in electronic communication with the user device and the emulation server and an administrator storage module having instructions stored thereon for configuring the administrator processor to: receive a request from the user device to establish the emulation session; establish an electronic communication link between the user device and the emulation server for providing the emulation session to the user device; determine emulation session data based on the received request and by monitoring the emulation session; determine a plurality of emulation session parameters based on the emulation session requested; determine a session action to be applied to the emulation session based on the plurality of emulation session parameters and the emulation session data; and control the emulation session based on the session action.

BRIEF DESCRIPTION OF THE DRAWINGS

A preferred embodiment of the present invention will now be described in detail with reference to the drawings, in which.

DETAILED DESCRIPTION OF EXEMPLARY EMBODIMENTS

Figure 1:
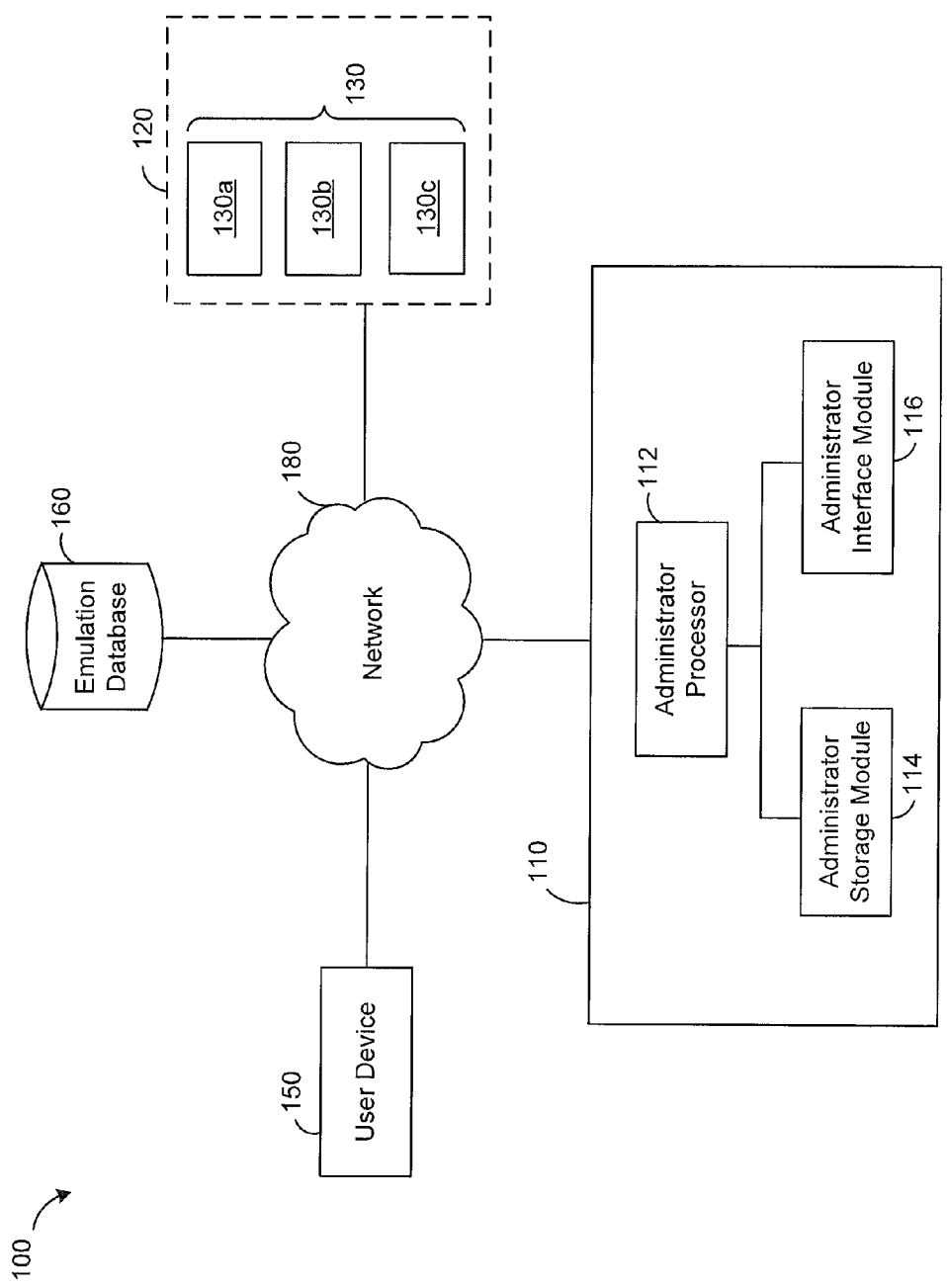
FIG. 1 is a block diagram of an administrator system in communication with other components in accordance with an example embodiment.

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The various embodiments described herein generally relate to a system (and related methods) for managing emulation sessions. After a request is received from a user device for establishing an emulation session, an electronic communication link can be established between the user device and the emulation server for providing the emulation session to the user device. The request can be referred to as an emulation request.

The emulation session generally involves providing to a user device an imitated computer product. The computer product can be a computer system, an operating environment, a software application, and/or one or more hardware and software components. The hardware components can include hardware devices, such as a mobile device or a tablet computer. The computer product can be provided in an emulation session using one or more emulation components, such as a software component and/or hardware component.

To determine a session action to be applied to the emulation session for controlling the emulation session, emulation session data and emulation session parameters can be determined. The emulation session data can be determined based on data provided in the emulation request and from monitoring the emulation session. The emulation session parameters can generally be determined based on the emulation request. The session action can then be determined based on the emulation session parameters and the emulation session data.

Reference is first made to FIG. 1, which illustrates a block diagram 100 of an administrator module 110 in communication with other components.

As shown in FIG. 1, the administrator module 110 can communicate with each of an emulation system 120 that includes one or more emulation servers 130, a user device 150, and an emulation database 160 over a network 180. Similarly, each of the user device 150, the emulation system 120 and/or the emulation database 160 can also communicate with each other over the network 180. For clarity, only one user device 150 is illustrated in FIG. 1 but it will be understood that one or more user devices 150 can communicate with the administrator module 110 and/or the emulation system 120 at any given time.

Generally, the administrator module 110 manages emulation sessions provided by the emulation system 120. The administrator module 110 can monitor and/or control emulation sessions. As will be described below, the administrator module 110 manages emulation sessions provided by the emulation system 120 based on a variety of factors, such as data provided in the emulation request received from the user device 150, data associated with the emulation session, and/or emulation session parameters associated with the emulation session. Operations of the administrator module 110 are described below in further details with reference to FIG. 3.

For ease of exposition, the administrator module 110 illustrated in FIG. 1 is provided as a computer server that is capable of network communication and also separate from the emulation system 120. The administrator module 110 includes an administrator processor 112, an administrator storage module 114, and an administrator interface module 116. It will be understood that the administrator module 110 can also be provided using one or more computer servers.

In some embodiments, the administrator module 110 can be provided as part of the emulation system 120, as a server separate from the emulation servers 130 or as a software component on at least one of the emulation servers 130. For example, the administrator module 110 can be provided as an emulation session control application that can be installed on any one or more of the emulation servers 130. The administrator module 110 can be downloaded from the network 180 or pre-installed on the emulation server 130. The administrator module 110 can be a standalone application or part of another software application.

When the administrator module 110 is provided to the emulation server 130 as a software component, the components of the administrator module 110 can be provided by the emulation server 130. For example, a processor on the emulation server 130 can also operate as the administrator processor 112, a storage module on the emulation server 130 can also operate as the administrator storage module 114 and an interface module on the emulation server 130 can also operate as the administrator interface module 116.

The administrator processor 112 can operate with one or more of the other components in the administrator module 110. For example, the administrator processor 112 can operate with the administrator interface module 116 for receiving the emulation request from the user device 150 and/or for providing session actions to the emulation system 120. The administrator processor 112 can also operate to monitor the emulation system 120 and/or to determine session actions to be applied to emulation sessions provided by the emulation system 120.

The administrator storage module 114 can store data related to management of emulation sessions currently provided by the emulation system 120. For example, the administrator storage module 114 can store emulation session parameters and session actions corresponding to the emulation session parameters.

The administrator interface module 116 generally provides a communication interface for the administrator module 110. The administrator interface module 116 can include one or more communication ports and/or components for receiving data from and/or transmitting data to external components and/or devices. The communication ports can include a USB port, a serial port and/or one or more other peripheral ports. The administrator interface module 116 can provide communication via different communication protocols, such as for example via radio-frequency, wireless, and/or Bluetooth™ communication.

The administrator module 110 can monitor the emulation system 120 at different time intervals. For example, the administrator module 110 can monitor the emulation system 120 continuously, at predetermined time intervals, and/or upon receipt of a request or indication from the emulation system 120 to conduct the monitoring operation.

The administrator module 110 can further provide a management user interface from which inputs can be provided by an emulation system administrator of the emulation system 120 and/or a user of the user device 150. In some embodiments, the inputs can indicate session actions that the emulation system administrator wants to execute with respect to emulation sessions. The session actions can include terminating the communication link between the user device 150 and the emulation system 120 thereby logging a user of the user device 150 out of the emulation session and also ending the emulation session, pausing an emulation session (e.g., placing the emulation session in a wait or sleep mode), and/or directing the emulation system 120 to save the settings of an emulation session.

The administrator module 110 can also display emulation session data on the management user interface. For example, the administrator module 110 can retrieve data from the emulation database 160 for display on the management user interface. The administrator module 110 can retrieve data that is associated with one or more emulation sessions currently provided by the emulation system, such as emulation session identifiers corresponding to the emulation sessions and data associated with users currently using emulation sessions provided by the emulation system 120. The data associated with users can include connected user identifiers corresponding to users currently using emulation sessions, location identifiers corresponding to a geographical location and/or a network location (e.g., an Internet Protocol (IP) address) of the user device 150 of the connected users, and/or activity levels of the connected users.

In some embodiments, the administrator module 110 can securely provide access to the management user interface via a web browser application. For example, the management user interface can be accessed via an IP address associated with the administrator module 110. The administrator module 110 can further require that proper login credentials be provided from the emulation system administrator or the user before providing access to the management user interface.

The emulation system 120 can include one or more emulation servers 130. As illustrated in FIG. 1, the emulation system 120 can include emulation servers 130*a*, 130*b*, and 130*c*. For ease of exposition, only emulation servers 130*a*, 130*b*, and 130*c* are illustrated. It will be understood that a fewer or greater number of emulation servers 130 can be provided in the emulation system 120.

The emulation server 130 can include a host computer for providing emulation sessions to the user device 150. The emulation server 130 generally operates to provide an emulation session for emulating a computer product as identified in the emulation request received from the user device 150.

The emulation server 130 can include one or more software and/or hardware modules for providing emulation sessions to the user device 150. These emulation sessions can include emulation sessions that operate on the Remote Desktop Protocol (RDP). It will be understood that one emulation server 130 can provide more than one emulation session to one or more user devices 150 at a given time.

Figure 2:
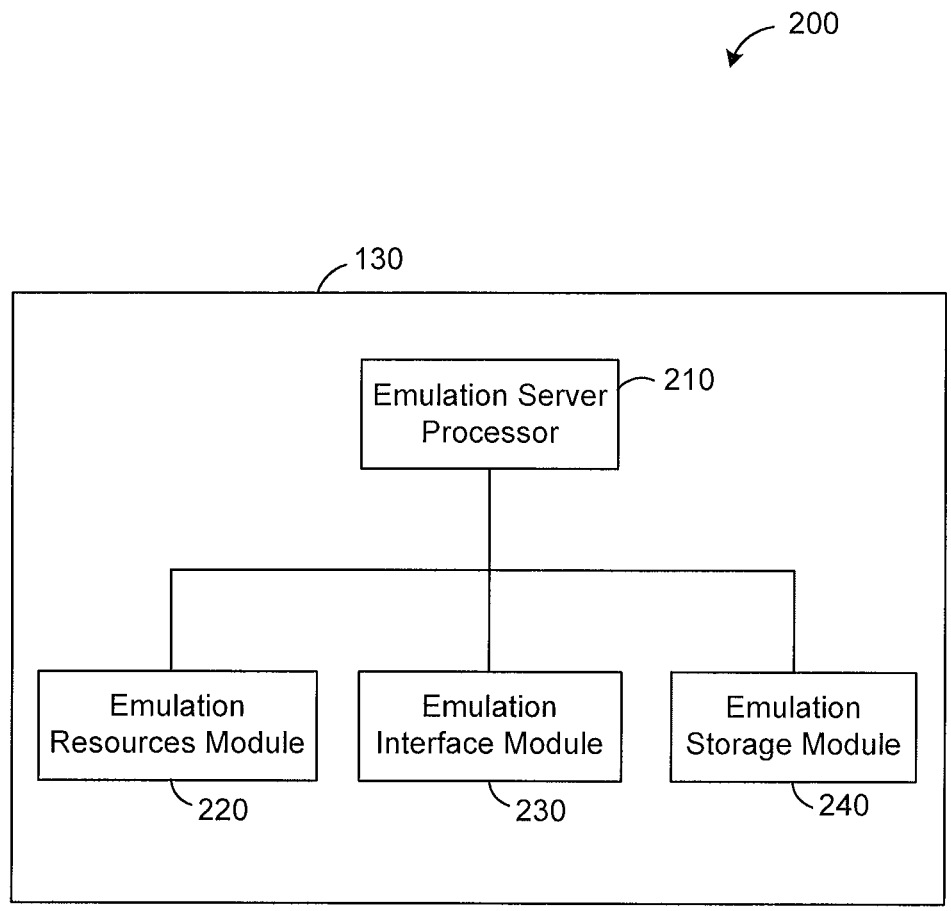
FIG. 2 is a block diagram of an emulation server in accordance with an example embodiment.

FIG. 2 is a block diagram 200 of an example emulation server 130. As illustrated in FIG. 2, the emulation server 130 can include an emulation server processor 210, an emulation resources module 220, an emulation interface module 230 and an emulation storage module 240. It will be understood that other software and/or hardware modules can be provided on the emulation server 130.

The emulation server processor 210 can operate with one or more other modules on the emulation server 130. For example, the emulation server processor 210 can operate with the emulation interface module 230 for receiving the emulation request from the user device 150 and/or for receiving session actions from the administrator module 110. The emulation server processor 210 can also operate with the emulation resources module 220 for accessing and/or launching resources required for providing the emulation session identified in the emulation request.

The emulation resources module 220 can include hardware and software modules for providing the emulation sessions.

The emulation resources module 220 can include resources that are used for emulating the computer product identified in the emulation request.

The emulation interface module 230 generally provides a communication interface for the emulation server 130. The emulation interface module 230 can include one or more communication ports and/or components for receiving data from and/or transmitting data to external components and/or devices. The communication ports can include a USB port, a serial port and/or one or more other peripheral ports. The emulation interface module 230 can provide communication via different communication protocols, such as for example via radio-frequency, wireless, and/or Bluetooth™ communication.

The emulation storage module 240 can store data related to emulation sessions that can be provided by the emulation server 130 and/or data related to emulation sessions currently provided by the emulation server 130. For example, the emulation storage module 240 can store one or more computer products that can be provided in an emulation session by the emulation server 130 and/or a corresponding list of resources that are required for emulating any of those one or more computer products.

Referring again to FIG. 1, the user device 150 can generally be any computing device capable of network communication. For example, and without limitation, the user device 150 can be a personal computer, laptop, personal data assistant, cellular telephone, smart-phone device, tablet computer, and/or wireless device. The user device 150 can include one or more components or modules that operate based on software and/or hardware. For example, the user device 150 includes, at least, a user device processor and a user device storage module. The user device processor can generate the emulation request.

As described above, the emulation database 160 can be accessed over the network 180 by any of the user device 150, the administrator module 110 and the emulation system 120. It will be understood that the emulation database 160 can be provided as an external storage device, as illustrated in FIG. 1, or can instead be provided as a component within the administrator module 110 and/or the emulation system 120. For example, the administrator storage module 114 can include at least a portion of the emulation database 160 and the emulation storage module 240 can include at least a portion of the emulation database 160.

The emulation database 160 can be provided with any database implementations, such as an implementation that uses Structured Query Language (SQL). It will be understood that the emulation database 160 can include one or more databases.

The emulation database 160 can store requirements or conditions associated with emulation sessions that can be provided by the emulation system 120 and data associated with emulation sessions that are currently being provided by the emulation system 120.

Conditions or requirements associated with emulation sessions that can be provided by the emulation system 120 can include emulation session parameters. The emulation session parameters generally provide operational conditions of emulation sessions and/or requirements that need to be satisfied in order for the emulation session to commence or to continue.

For example, the emulation session parameters can include pre-defined statuses that indicate a status of an emulation session. The pre-defined statuses can include an emulation requested status, an emulation in progress status, an emulation inactive status, and an emulation interrupted status. The emulation requested status indicates that a request for establishing an emulation session has been received by the administrator module 110 but the emulation session has not commenced. The emulation in progress status indicates that the emulation session is currently being provided by the emulation system 120. The emulation inactive status indicates that the emulation session was previously being provided by the emulation system 120 but has been terminated by the administrator module 110. The emulation interrupted status indicates that the emulation session was previously being provided by the emulation system 120 but has been temporarily terminated by the administrator module 110 due to a connection loss between the user device 150 and the emulation system 120. That is, the emulation session with the emulation interrupted status can be resumed when the user device 150 reestablishes the communication link with the emulation system 120.

The emulation session parameters can include task lists which provides various conditions or restrictions that should be satisfied in order for the emulation session to commence or to continue. The emulation session parameters can be provided by the emulation system administrator and/or the user of the user device 150. The emulation session parameters can be provided via the management user interface, for example. The emulation session parameters can also include default requirements for the emulation server 130 that can be provided by a manufacturer of the emulation server 130.

For example, the emulation session parameters can include user qualifications that need to be satisfied in order for the emulation session to commence. When the emulation session commences, the administrator module 110 switches the emulation status of the emulation session from the emulation requested status to the emulation in progress status. The user qualifications can include a user minimum account amount, a maximum computer product requirement, a user device technical capacity requirement, and a communication link capacity requirement. It will be understood that other user qualifications can similarly be used.

The user minimum account amount indicates a balance of funds associated with a user account that is necessary for the emulation session to be provided. The user minimum account amount can be a monetary value or any other indicator that corresponds to a monetary value.

The maximum computer product requirement provides a maximum number of emulation sessions that can be simultaneously provided for each computer product for each user account. The maximum computer product requirement can be provided as a positive integer value. In some embodiments, the maximum computer product requirement is one so that only one emulation session for a computer product can be provided for a user account.

The user device technical capacity requirement indicates resources that need to be available at and/or accessible by the user device 150 in order for the emulation session to be provided. For example, the user device technical capacity requirement can include a screen size requirement, peripheral component requirements, and other operational requirements.

The communication link capacity requirement indicates a capacity of the communication link between the user device 150 and the emulation system 120 that is needed in order for the emulation session to be provided. The capacity of the communication link can be defined in terms of a speed at which data can be transferred via the communication link or an amount of data that can be transferred via the communication link within a time period. For example, the communication link capacity requirement can be a bandwidth value.

The emulation session parameters can be specific to each emulation server 130 within the emulation system 120, each emulation session, each user device 150, and each user account within the emulation system 120. There can also be emulation session parameters that can apply to the emulation system 120 in general.

For example, an emulation session parameter specific to emulation servers 130 can include a user activity requirement. The user activity requirement can indicate a minimum period of inactivity that can occur during any emulation session provided on that emulation server 130 before that emulation session is terminated by the administrator module 110. Optionally, the user activity requirement may be different for different emulation servers, or may vary depending on the activity level (such as the number of other emulation sessions) on that emulation server or all of the emulation servers generally.

Emulation session parameters specific to an emulation session can include a preferred memory size threshold, which is a minimum memory size required to be available at the user device storage module in order for the user device storage module to be used for providing at least a portion of the emulation session.

Emulation session parameters that apply generally to the emulation system 120 include a product license limit for a computer product that is available to be provided in an emulation session, or for one or more emulation components required for providing an emulation session of that computer product. The product license limit indicates a maximum number of licenses that are available for a specific computer product, or for each emulation component required for providing the computer product. For example, image processing software can be available to be provided in an emulation session within the emulation system 120 but the emulation system 120 may have only fifty licenses available for that image processing software. Therefore, whether that image processing software can be provided in an emulation session depends on whether at least one of the fifty licenses is available.

Data associated with emulation sessions that are currently being provided by the emulation system 120 can include emulation session data, which can include session information, associated tracking information, record keeping information and other analytics information. For each emulation session, the corresponding emulation session data can include data identifying the emulation session, the emulation server 130 providing the emulation session, the computer product being emulated in the emulation session, the user device 150 for which the emulation session is provided, the user using the emulation session via the user device 150, and general operation or status of the emulation session and the emulation server 130.

For example, the emulation session data associated with the user device 150 can include a geographical location and/or a network location (e.g., IP address), and a user device technical capacity indicating resources that are available on the user device 150 or accessible by the user device 150 as well as properties of the user device 150, such as a memory size of the user device storage module and a size of the display. The emulation session data associated with the user can include a user identifier corresponding to a user account of the emulation system 120 and/or user account information. The emulation session data associated with the computer product provided in the emulation session can include a computer product identifier. The emulation session data associated with the user device 150, the user, and the computer product can be provided in the emulation request.

The emulation session data can be determined from the emulation request and/or from monitoring the operation of the emulation session or the emulation server 130 providing the emulation session. Accordingly, the emulation session data determined from monitoring the operations of the emulation session or the emulation server 130 can change over time and is therefore updated throughout the emulation session.

The administrator module 110 can use at least the emulation session data and the emulation session parameters for determining session actions to be applied to the emulation session. For example, the administrator module 110 can determine, based on the emulation session data, an emulation status indicator that indicates a status of the emulation session. The emulation status indicator corresponds to one of the pre-defined statuses. The administrator module 110 can also determine, based on the emulation session data, a user activity indicator and/or a connectivity loss indicator. The user activity indicator generally provides an activity level or usage level of the emulation session by the user. The activity level can be provided as a numerical range (e.g., a percentage value), or measured in terms of periods of inactivity or low activity. The connectivity loss indicator generally provides an amount of time for which the communication link between the user device 150 and the emulation system 120 is lost and/or below a required connection threshold.

The emulation database 160 can also store data associated with each user with user accounts to the emulation system 120. The data associated with each user can include user preferences indicating how the user prefers the emulation session to be provided and a monetary balance. For example, the user preferences can include an indication of peripherals at the user device 150 that are preferred to be used, an indication of how a user interface of the emulation session is to be provided at the user device 150, an indication of a preferred payment method and other general settings associated with the emulation session.

The network 180 can include a local network, a mobile network and/or the internet.

Figure 3:
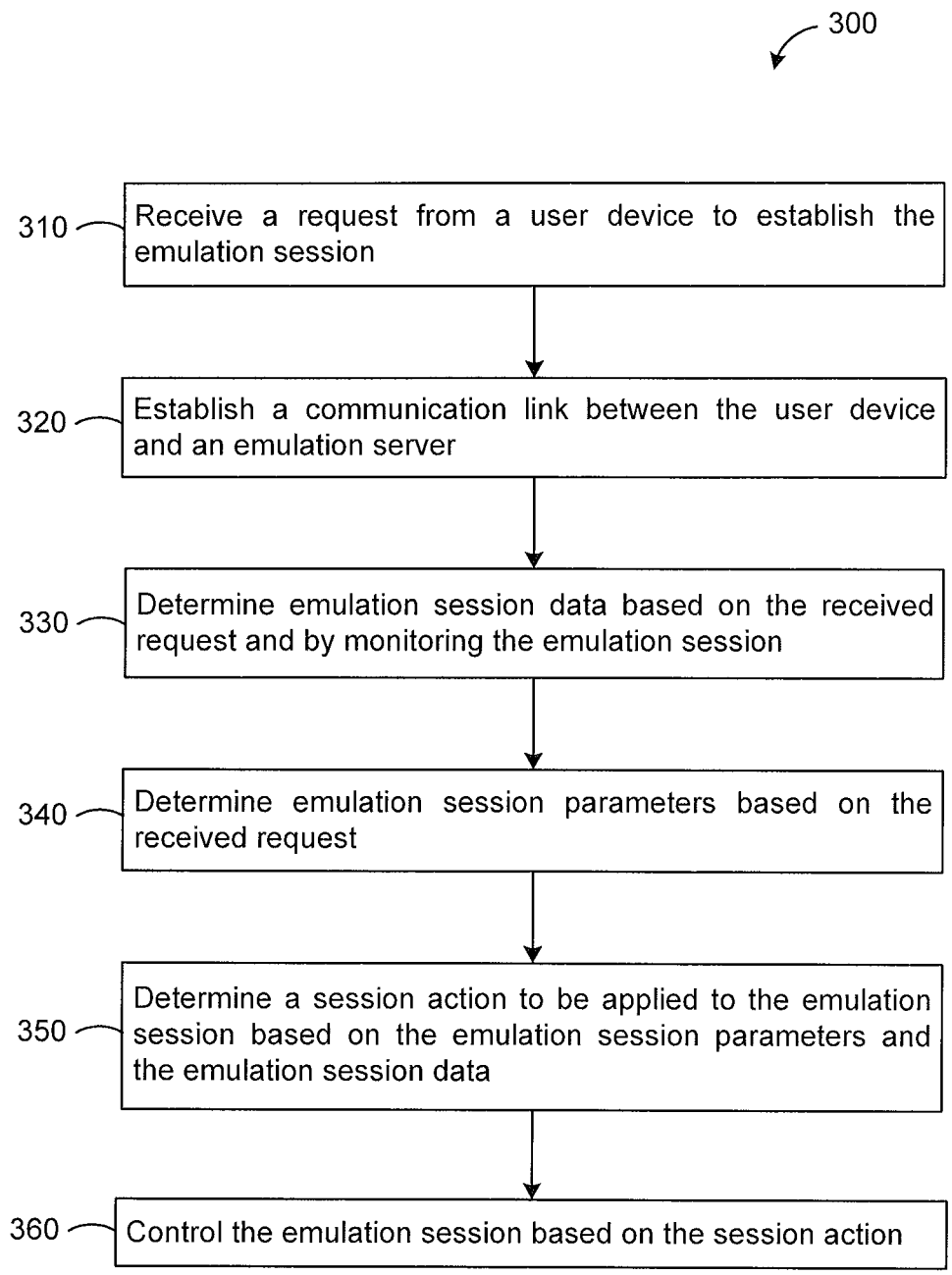
FIG. 3 is a flowchart illustrating a process for managing emulation sessions in accordance with an example embodiment.

FIG. 3 is a flowchart 300 of an example process of managing emulation sessions.

At Step 310, the Administrator Module 110 Receives a Request from a User Device 150 to Establish the Emulation Session.

As described above, the request received from the user device 150, or the emulation request, can include data associated with the user device 150 and the emulation session being requested. For example, the request can include data associated with the user accessing the user device 150, such as a user identifier, data associated with the computer product to be provided in the requested emulation session, such as a computer product identifier, and/or data associated with the user device 150, such as the user device technical capacity (such as processor speed, sound/audio capabilities etc.) and user device properties such as a display size or memory size of the user device storage module.

In some embodiments, the administrator module 110 can receive the emulation request from the emulation system 120 instead of from the user device 150 directly. In some further embodiments, the emulation system 120 can store data provided in the emulation request in the emulation database 160 so that the administrator module 110 can access the data provided in the emulation request.

At Step 320, the Administrator Module 110 Establishes a Communication Link Between the User Device 150 and an Emulation Server 130.

After receiving the emulation request, the administration system 120 establishes the communication link between the user device 150 and at least one of the emulation servers 130 in the emulation system 120 so that the emulation server 130 can provide the emulation session to the user device 150. The communication link can be provided over the network 180.

At Step 330, the Administrator Module 110 Determines Emulation Session Data Based on the Received Request and by Monitoring the Emulation Session.

As described above, the emulation session data include data provided in the emulation request and data corresponding to the emulation session. The emulation session data determined can be used, for example, for determining the emulation status indicator, the communication link capacity, the user device technical capacity, the user activity indicator, and the connectivity loss indicator.

Upon receiving the emulation request from the user device 150 and prior to determining if the relevant one or more user qualifications are satisfied, the administrator module 110 indicates that the emulation status indicator for the emulation session being requested is the emulation requested status.

The administrator module 110 can switch the emulation status indicator from the emulation requested status to the emulation in progress status after determining that the relevant user qualifications are satisfied.

At Step 340, the Administrator Module 110 Determines Emulation Session Parameters Based on the Received Request.

As described above, the emulation session parameters can include pre-defined statuses for emulation sessions, such as the emulation requested status, the emulation in progress status, the emulation interrupted status, and the emulation inactive status. The emulation session parameters can include user qualifications that need to be satisfied in order for the emulation status indicator to switch from the emulation requested status to the emulation in progress status.

For an emulation system with the emulation in progress status, the administrator module 110 can determine emulation session parameters that include the user qualifications described above and parameters associated with emulation sessions currently being provided by the emulation system 120. For example, emulation session parameters associated with existing emulation sessions include the user activity requirement and the maximum connection loss threshold.

At Step 350, the Administrator Module 110 Determines a Session Action to be Applied to the Emulation Session Based on the Emulation Session Parameters and the Emulation Session Data.

The session action can include any operation instruction for controlling the emulation session. For example, the session action can include an instruction to commence the emulation session or to terminate the emulation session. The session action can also include updating the emulation status indicator for the emulation session. It will be understood the session action can include one or more instructions.

For an emulation server 130 with the emulation requested status, the administrator module 110 can determine if the relevant one or more user qualifications are satisfied based on the emulation request and the emulation session data determined at step 330. For example, the administrator module 110 can determine that the session action includes switching the emulation status indicator from the emulation requested status to the emulation in progress status after determining that the relevant one or more user qualifications are satisfied. The administrator module 110 can further determine that the session action includes commencing the emulation session.

In some embodiments, the user qualifications can include the user minimum account amount. The administrator module 110 can determine if the user minimum account amount is satisfied by identifying the user account for the user accessing the user device 150 based on the user identifier provided in the emulation request, and by determining whether an amount of funds associated with the identified user account is greater than the user minimum account amount. The user qualification is satisfied if the amount of funds is determined to exceed the user minimum amount. For example, the user minimum account amount can indicate that an emulation session can only be provided for a user account with a balance of at least $10. The emulation session can commence if the administrator module 110 determines that the identified user account has funds with a value greater than $10.

In some embodiments, the user qualifications can include the maximum computer product requirement. The administrator module 110 can determine if the maximum computer product requirement is satisfied by identifying the user account for the user accessing the user device 150 based on the user identifier provided in the emulation request. The administrator module 110 can then determine a number of identical emulation sessions associated with the user account. Identical emulation sessions are emulation sessions associated with the emulation in progress status and that provide the computer product associated with the computer product identifier provided in the emulation request. The administrator module 110 can determine if the user qualification is satisfied by determining if the number of identical emulation sessions is more than the maximum computer product requirement. The user qualification is satisfied if the number of identical emulation sessions is more than the maximum computer product requirement. For example, the emulation system administrator can indicate that a user account can only be associated with one emulation session for any computer product. The maximum computer product requirement is therefore one. Accordingly, if the administrator module 110 determines that the user account is associated with more than one emulation sessions providing the same computer product, the maximum computer product requirement has been exceeded.

However, if the administrator module 110 determines that the number of identical emulation sessions is greater than the maximum computer product requirement, the administrator module 110 can indicate that the session action is to terminate at least one of the identical emulation sessions so that the number of identical emulation sessions is less than the maximum computer product requirement. For example, the administrator module 110 can respond by including in the session action an instruction to refuse the emulation request or an instruction to end the existing emulation sessions providing the computer product identified in the emulation request and to commence an emulation session corresponding to the emulation request.

In some embodiments, the emulation session parameters can include the product license limit for each emulation component required for providing an emulation session of the computer product. The administrator module 110 can determine, for each emulation component, if the product license limit is satisfied by determining a number of license uses of that emulation component in emulation sessions currently being provided within the emulation system 120. As described above, these emulation sessions are emulation sessions associated with the emulation in progress status and that provide a computer product that requires that emulation component in order to be emulated. The administrator module 110 can determine the session action by determining, for each emulation component, if the number of license uses is less than the product license limit. If the administrator module 110 determines that the number of license uses is less than the product license limit, the administrator module 110 can determine that the session action includes commencing the emulation session and switching the emulation status indicator from the emulation requested status to the emulation in progress status. Otherwise, the administrator module 110 maintains the emulation status as the emulation requested status.

However, if the administrator module 110 determines that the number of license uses is equal to the product license limit, the administrator module 110 can indicate that the session action is to terminate at least one of the emulation sessions using that emulation component so that the number of license uses is less than the product license limit. For example, the administrator module 110 can respond by including in the session action an instruction to refuse the emulation request or an instruction to end at least one of the existing emulation sessions using that emulation component and to commence an emulation session corresponding to the emulation request.

In some cases, of course, the product license limit may pertain directly to the computer product being emulated, instead of a particular emulation software or hardware component that is required to provide the emulation session of that computer product or indeed the emulation of different computer products, all of which require that particular software or hardware. However, the end result is the same. If all of the product licenses available have been used up, then no further emulation sessions requiring that particular emulation software or hardware component are possible until at least one emulation session is completed, or terminated, to free up one of the product licenses.

In some embodiments, the user qualifications can include the user device technical capacity requirement. The administrator module 110 can determine if the user device technical capacity requirement is satisfied by comparing the user device technical capacity of the user device 150 determined from the emulation session data with the user device technical capacity requirement. For example, the user device technical capacity requirement can indicate that a camera component needs to be available in order for the emulation session to be provided. If the administrator module 110 determines, from the emulation session data, that the user device 150 does not include a camera component or cannot access a camera component, the administrator module 110 determines that the user device technical capacity requirement has not been satisfied and the emulation session cannot be commenced.

In some embodiments, the user qualifications can include the communication link capacity requirement. The administrator module 110 can determine if the communication link capacity requirement is satisfied by comparing the communication link capacity determined from the emulation session data with the communication link capacity requirement. For example, the communication link capacity requirement can indicate that the communication link needs to sustain a bandwidth of at least 1 GB/s. If the administrator module 110 determines that the communication link capacity determined from the emulation session cannot provide the bandwidth of at least 1 GB/s, the communication link capacity requirement has not been satisfied and the emulation session cannot be commenced.

In some embodiments, after determining that the relevant one or more user qualifications are satisfied, the administrator module 110 can determine that the session action includes identifying the user account based on the user identifier and determining the user preferences associated with the identified user account. The administrator module 110 can determine that the session action further includes commencing the emulation session in accordance with the determined user preferences.

In some embodiments, after determining that the relevant one or more user qualifications are satisfied, the administrator module 110 can determine the display size of the user device 150 based on the emulation session data and determine that the session action includes determining a scaling parameter for scaling a computer product image of the computer product based on the determined display size. The scaling parameter corresponds to a factor use of which an interface or an image of a computer product can be resized in order to be appropriate for providing the image of the computer product to the user device 150 in an emulation session. For example, a default interface size for the computer product to be emulated can be larger than the display size of the user device 150. Accordingly, in order to improve the user experience of the emulation session, the administrator module 110 can scale the interface of the computer product by the scaling parameter so that the interface is appropriate for display on the display of the user device 150. Alternatively, a default image size of the computer product can be smaller than the display size of the user device 150, and therefore, the administrator module 110 can scale the image of the computer product by the scaling parameter to an appropriate size that maintains an appropriate resolution of the image. The administrator module 110 can determine that the session action further includes scaling a computer product image of the computer product to be provided in an emulation session by the scaling parameter.

For example, if a hardware component, such as a mobile device is emulated in an emulation session, the administrator module 110 can scale an image of the mobile device such that the image fits appropriately within the display of the user device 150.

In some embodiments, after determining that the relevant one or more user qualifications are satisfied, the administrator module 110 can determine that the session action includes determining the user memory size of the user device storage module based on the emulation request, or in response to a query sent to the user device after the emulation request is received, and determining if the user memory size satisfies the preferred memory size threshold. The administrator module 110 can determine that the session action further includes commencing the emulation session and if the user memory size is determined to satisfy the preferred memory size threshold, the administrator module 110 can save some data associated with the emulation session in the user device storage module. By using the user device storage module for storing a portion of data associated with the emulation session, the rate at which the emulation session can be provided to the user device 150 can be improved. In some embodiments, the data saved in the user device storage module can include cache data corresponding to the emulation session.

When the emulation server 130 is associated with the emulation in progress status and the emulation session parameter includes the user activity requirement, the administrator module 110 can determine the session action by determining a user activity indicator from the emulation session data and determining if the user activity level satisfies the user activity requirement. If the administrator module 110 determines that the user activity level satisfies the user activity requirement, the administrator module 110 can indicate that the session action includes maintaining the emulation session and retaining the emulation status indicator as the emulation in progress status. However, if the administrator module 110 determines that the user activity level does not satisfy the user activity requirement, the administrator module 110 can indicate that the session action includes terminating the emulation session by closing the communication link and switching the emulation status indicator from the emulation in progress status to the emulation inactive status.

For example, the emulation system administrator can indicate that an emulation session cannot be idle for a period longer than ten minutes. The user activity requirement can therefore require that an emulation session not be inactive for more than ten minutes. If the administrator module 110 determines that the user activity level indicates inactivity for more than ten minutes, the administrator module 110 determines that the user activity requirement is not satisfied.

When the emulation server 130 is associated with the emulation in progress status and the emulation session parameter includes the maximum connection loss threshold, the administrator module 110 can determine the session action by determining a connectivity loss indicator based on the emulation session data and determining if the connectivity loss indicator satisfies the maximum connection loss threshold. If the administrator module 110 determines that the connectivity loss period satisfies the maximum connection loss threshold, the administrator module 110 can indicate that the session action includes maintaining the emulation session and retaining the emulation status indicator as the emulation in progress status. However, if the administrator module 110 determines that the connectivity loss period does not satisfy the maximum connection loss threshold, the administrator module 110 can indicate that the session action includes terminating the emulation session by closing the communication link and switching the emulation status indicator from the emulation in progress status to the emulation interrupted status.

For example, if the user of the user device 150 anticipates entering a dead zone in which no connection can be sustained between the user device 150 and the emulation 120, the user can indicate that an emulation session can have a period of connection loss without being terminated. The period of allowable connection loss, or the maximum connection loss threshold, can be a period of an hour, for example. If the administrator module 110 determines that the connectivity loss indicator indicates a connection loss between the user device 150 and the emulation system 120 of more than an hour, the administrator module 110 determines that the maximum connection loss threshold is not satisfied.

At Step 360, the Administrator Module 110 Controls the Emulation Session Based on the Session Action.

The administrator module 110 proceeds to apply the session action determined at step 350. In some embodiments, the administrator module 110 can control the emulation session by providing the determined session action to the emulation system 120 via the administrator interface module 116 over the network 180.

In some embodiments, the administrator module 110 can include an RDP session monitor/control application. The emulation system administrator can log a user out of an emulation session to save an RDP session, save favourite settings for the user, or put the emulation session in a wait state/sleep mode. The emulation system administrator can also disconnect the user. The emulation system administrator can set the task list to automatically execute any of the above described session actions, such as to log a user out of an emulation session, to save favourite settings, to put the emulation session in a wait state or a sleep mode. The task list can be automated according to desired schedule.

The RDP session monitor/control application can be a standalone application provided on a computer server in the network 180. The RDP session monitor/control application can be independent from domain control and therefore, emulation sessions provided in different domains can be monitored regardless of the domain list on the emulation servers providing the emulation sessions. Accordingly, emulation session users, including, for example, desktop computer users with multiple concurrent connections to the emulation system 120, can be monitored regardless of their domain list content.

The RDP session monitor/control application can be securely accessed from a web browser to configure each emulation session and/or user operation. The RDP session monitor/control application can also provide access to associated tracking, record keeping, and other analytics information.

The RDP session monitor/control application can monitor any emulation session and/or emulation session user stored in the emulation database 160. The emulation session and/or the emulation session user can be stored in the emulation database 160 according to a registry information on the emulation server 130 and the emulation database 160. The emulation server 130 and the emulation database 160 are each accessible by the RDP session monitor/control application and by a user via the web browser.

The RDP session monitor/control application can configure each session or user, based on information stored in the emulation database 160 (e.g., functions and tasks) generated in association with user, server and task lists, and administrator control. The emulation system administrator and/or a user can select and/or display variables including emulation session identification, connected user identification, connected user location, connected user IP address, duration of inactivity, via an emulation system interface accessible via the web browser.

In some embodiments, the RDP session monitor/control application can be installed on a server computer and launched before the emulation sessions begin. When the RDP session monitor/control application is launched, the RDP session monitor/control application gains access to the network 180. In some other embodiments, the RDP session monitor/control application can be launched after the emulation sessions have started. The RDP session monitor/control can dynamically update data stored in the emulation database 160 for each of the user, server, and task lists and other settings while the emulation sessions proceed.

In some embodiments, the emulation system administrator can edit registry on the computer server hosting the administrator module 110 to permit access to the user device 150 by the RDP session monitor/control application.

In some embodiments, the emulation system administrator can access the administrator module 110 by entering the IP address of the computer server hosting the administrator module 110. The computer server hosting the administrator module 110 can further require the login credentials, such as an administrator user name and password, before allowing access to the administrator module 110.

In some embodiments, the RDP session monitor/control application can access the emulation database 160 to retrieve a list of servers. In some embodiments, the list of servers can be automatically provided to the computer server hosting the RDP session monitor/control application at preset time intervals (e.g., every five minutes).

In some embodiments, the emulation system administrator can provide task list configuration inputs (e.g., emulation session information, emulation session restrictions, etc.) for generating one or more task lists. The task list configuration inputs can be provided via a web browser and stored in the emulation database 160.

In some embodiments, the RDP session monitor/control application can check the updated list of servers, task list and/or global settings at preset time intervals (e.g., every 5 minutes).

In some embodiments, the RDP session monitor/control application can retrieve the list of emulation users and emulation session logs from the computer server hosting the RDP session monitor/control application and provide the retrieved data to the emulation database 160.

In some embodiments, the RDP session monitor/control application can retrieve a live inventory of emulation sessions from the emulation database 160 in order to determine whether one or more emulation sessions are active or inactive.

In some embodiments, the RDP session monitor/control application can access emulation database 160 to retrieve the task list and to execute the retrieved task list.

The present invention has been described here by way of example only. Various modification and variations may be made to these exemplary embodiments without departing from the spirit and scope of the invention, which is limited only by the appended claims.

The invention claimed is:

1. A method for managing an emulation session of a computer product, the method comprising:

receiving a request from a user device to establish the emulation session, the user device comprising a user device processor;

establishing an electronic communication link between the user device and an emulation server for providing the emulation session to the user device; and operating at least one server processor, the at least one server processor being in electronic communication with the user device and the emulation server and the at least one server processor being separate from the user device processor, to:

retrieve emulation session data based on the received request, the emulation session data comprising at least one of (i) requested session data associated with the emulation session being requested and (ii) session status data retrieved by monitoring one or more emulation sessions being provided by the emulation server;

determine a plurality of emulation session parameters based on the received request, the plurality of emulation session parameters defining one or more conditions required to be satisfied for the requested emulation session to be provided by the emulation server;

determine a session action to be applied at the emulation server, the session action being determined based on the plurality of emulation session parameters and the emulation session data, wherein determining the session action comprises:

determining a status of the emulation session based on the emulation session data;

identifying a subset of emulation session parameters from the plurality of emulation session parameters based on the status of the emulation session;

in response to determining the status of the requested emulation session is an emulation requested status, defining the session action to comprise: (i) commencing the requested emulation session and (ii) one or more instructions for providing the emulation session according to the subset of emulation session parameters; and in response to determining the status of the requested emulation session is an emulation in progress status, defining the session action to comprise: (i) maintaining the emulation session and (ii) one or more instructions for continuing the emulation session based on the subset of emulation session parameters; and control the emulation server in accordance with the session action.

2. The method as defined in claim 1, wherein:

the plurality of emulation session parameters comprises a plurality of pre-defined statuses of the emulation session, the plurality of pre-defined statuses of the emulation session being stored in a storage module in electronic communication with the at least one server processor and comprising the emulation requested status and the emulation in progress status;

the plurality of emulation session parameters further comprises a plurality of user qualifications to be satisfied before an emulation status indicator is switched from the emulation requested status to the emulation in progress status;

operating the at least one server processor to determine the session action further comprises, after receiving the request from the user device:

determining if the plurality of user qualifications is satisfied based on at least one of the received request and the emulation session data; and determining the emulation status indicator indicating the status of the emulation session based on the emulation session data, the status of the emulation session is one of the plurality of pre-defined statuses of the emulation session;

upon receiving the request from the user device to establish the emulation session and prior to determining if the plurality of user qualifications is satisfied, the emulation status indicator is the emulation requested status; and if the plurality of user qualifications is determined to be satisfied, the session action comprises:

switching the emulation status indicator from the emulation requested status to the emulation in progress status.

3. The method as defined in claim 2, wherein the request comprises a user identifier for a user of the user device requesting the emulation session;

the plurality of user qualifications comprises a user minimum account amount, the user minimum account amount representing a monetary value; and determining if the plurality of user qualifications is satisfied further comprises:

identifying a user account for the user based on the user identifier; and determining if an amount of funds stored in the user account is greater than the user minimum account amount.

4. The method as defined in claim 2, wherein the request comprises a user identifier for a user of the user device requesting the emulation session and a computer product identifier for the computer product being requested to be provided in the emulation session;

the plurality of user qualifications comprises a maximum computer product requirement; and determining if the plurality of user qualifications is satisfied further comprises:

identifying a user account for the user based on the user identifier;

determining a number of identical emulation sessions associated with the user account, the identical emulation sessions being emulation sessions associated with the emulation in progress status and providing the computer product corresponding to the computer product identifier;

determining if the number of identical emulation sessions is more than the maximum computer product requirement; and in response to determining the number of identical emulation sessions is greater than the maximum computer product requirement, defining the session action to comprise terminating at least one of the identical emulation sessions so that the number of identical emulation sessions is less than the maximum computer product requirement, otherwise, defining the session action to comprise maintaining the emulation session.

5. The method as defined in claim 2, wherein the plurality of user qualifications comprises a user device technical capacity requirement, the user device technical capacity requirement identifying one or more resources required for providing the emulation session; and operating the at least one server processor to determine the session action further comprises, after receiving the request from the user device:

determining a user device technical capacity for the user device based on the emulation session data; and determining if the plurality of user qualifications is satisfied comprises determining if the user device technical capacity satisfies the user device technical capacity requirement.

6. The method as defined in claim 2, wherein the plurality of user qualifications comprises a communication link capacity requirement; and operating the at least one server processor to determine the session action further comprises, after receiving the request from the user device:

determining a communication link capacity based on the emulation session data; and determining if the plurality of user qualifications is satisfied comprises determining if the communication link capacity satisfies the communication link capacity requirement.

7. The method as defined in claim 2, wherein:

the request comprises a user identifier for a user of the user device requesting the emulation session; and upon determining the plurality of user qualifications is satisfied, the session action further comprises:

identifying a user account for the user based on the user identifier;

determining a plurality of user preferences associated with the user account; and commencing the emulation session in accordance with the determined plurality of user preferences.

8. The method as defined in claim 1, wherein the plurality of emulation session parameters comprises a plurality of pre-defined statuses of the emulation session, the plurality of pre-defined statuses of the emulation session being stored in a storage module in electronic communication with the at least one server processor and comprising the emulation requested status and the emulation in progress status;

retrieving the emulation session data based on the received request further comprises determining a plurality of emulation components required for providing the computer product;

the plurality of emulation session parameters further comprises a plurality of product license limits, each product license limit in the plurality of product license limits indicates a maximum number of licenses available for each emulation component in the plurality of emulation components;

operating the at least one server processor to determine the session action comprises, after receiving the request from the user device:

determining an emulation status indicator indicating the status of the emulation session based on the emulation session data, the status of the emulation session is one of the plurality of pre-defined statuses of the emulation session;

upon receiving the request from the user device to establish the emulation session and prior to determining a session action to be applied to the emulation server, the emulation status indicator is the emulation requested status; and operating the at least one server processor to determine the session action further comprises:

for each emulation component, determining a number of license uses indicating a number of emulation sessions using that emulation component and associated with the emulation in progress status; and for each emulation component, determining if the number of license uses is less than the product license limit for that emulation component, and if so, defining the session action to comprise commencing the emulation session and switching the emulation status indicator from the emulation requested status to the emulation in progress status, otherwise defining the session action to comprise maintaining the emulation status indicator as the emulation requested status.

9. The method as defined in claim 8, wherein determining the session action further comprises:

for each emulation component, in response to determining the number of license uses is equal to the product license limit, defining the session action to comprise terminating at least one of the emulation sessions using that emulation component so that the number of license uses is less than the product license limit.

10. The method as defined in claim 1, wherein:
the plurality of emulation session parameters comprises a plurality of scaling parameters;
retrieving the emulation session data based on the received request further comprises determining a display size of the user device; and
determining the session action to be applied at the emulation server comprises:
selecting a scaling parameter from the plurality of scaling parameters based on the determined display size of the user device; and
defining the session action to comprise scaling a computer product image of the computer product provided in a display of the user device based on the scaling parameter.

11. The method as defined in claim 1, wherein:
the user device comprises a user device storage module;
the plurality of emulation session parameters comprises a preferred memory size threshold indicating a minimum memory size of the user device storage module in order to be used for providing at least a portion of the emulation session;
retrieving the emulation session data based on the received request further comprises determining a user memory size of the user device storage module; and determining the session action to be applied at the emulation server comprises defining the session action to comprise:
determining if the user memory size satisfies the preferred memory size threshold;
commencing the emulation session; and
in response to determining the user memory size satisfies the preferred memory size threshold, saving at least a portion of data associated with the emulation session in the user device storage module.

12. The method as defined in claim 1, wherein
the plurality of emulation session parameters comprises a plurality of pre-defined statuses of the emulation session, the plurality of pre-defined statuses of the emulation session being stored in a storage module in electronic communication with the at least one server processor and comprising the emulation in progress status and the emulation inactive status;
the plurality of emulation session parameters further comprises a user activity requirement;
operating the at least one server processor to determine an emulation status indicator indicating the status of the emulation session based on the emulation session data, the status of the emulation session is one of the plurality of pre-defined statuses of the emulation session;
prior to determining a session action to be applied to the emulation server, the emulation status indicator is the emulation in progress status; and
operating the at least one server processor to determine the session action further comprises:
determining a user activity indicator based on the emulation session data; and
determining if the user activity indicator satisfies the user activity requirement, and if so, defining the session action to comprise maintaining the emulation session and retaining the emulation status indicator as the emulation in progress status, otherwise terminating the emulation session by closing the communication link and switching the emulation status indicator from the emulation in progress status to the emulation inactive status.

13. The method as defined in claim 1, wherein:
the plurality of emulation session parameters comprises a plurality of pre-defined statuses of the emulation session, the plurality of pre-defined statuses of the emulation session being stored in a storage module in electronic communication with the at least one server processor and comprising the emulation in progress status and the emulation interrupted status;
the plurality of emulation session parameters further comprises a maximum connection loss threshold, the maximum connection loss threshold being a maximum amount of time for which the electronic communication link between the user device and the emulation server is lost before the emulation session is terminated;
operating the at least one server processor to determine an emulation status indicator indicating the status of the emulation session based on the emulation session data, the status of the emulation session is one of the plurality of pre-defined statuses of the emulation session;
prior to determining a session action to be applied to the emulation server, the emulation status indicator is the emulation in progress status; and
operating the at least one server processor to determine the session action further comprises:
determining a connectivity loss indicator based on the emulation session data, the connectivity loss indicator representing the amount of time for which the electronic communication link between the user device and the emulation server is lost; and determining if the connectivity loss indicator satisfies the maximum connection loss threshold, and if so, defining the session action to comprise maintaining the emulation session and retaining the emulation status indicator as the emulation in progress status, otherwise terminating the emulation session by closing the communication link and switching the emulation status indicator from the emulation in progress status to the emulation interrupted status.

14. The method as defined in claim 1, wherein the session action comprises at least one of:

in response to determining the emulation session data fails to satisfy the plurality of emulation session parameters, identifying at least one non-compliant emulation session parameter from the plurality of emulation session parameters and defining the session action based on the at least one non-compliant emulation session parameter, the at least one non-compliant emulation session parameter comprising the one or more conditions not satisfied by the emulation session data;

determining whether a user minimum account amount is satisfied based on at least one of the received request and the emulation session data, the user minimum account amount representing a monetary value, and defining the session action based on the user minimum account amount;

determining whether a user memory size satisfies a preferred memory size threshold; and in response to determining the user memory size satisfies the preferred memory size threshold, saving at least a portion of data associated with the emulation session in a user device storage module;

determining a user device technical capacity for the user device based on the emulation session data, and determining if the user device technical capacity satisfies a user device technical capacity requirement, the user device technical capacity requirement identifying one or more resources required for providing the emulation session; and determining a connectivity loss indicator based on the emulation session data, the connectivity loss indicator representing an amount of time for which the electronic communication link between the user device and the emulation server is lost, and determining if the connectivity loss indicator satisfies a maximum connection loss threshold, the maximum connection loss threshold being a maximum amount of time for which the electronic communication link between the user device and the emulation server is lost before the emulation session is terminated.

15. A system for managing an emulation session of a computer product, the emulation session being provided by an emulation server to a user device having a user device processor, the system comprising:

an administrator module comprising an administrator processor in electronic communication with the user device and the emulation server, and an administrator storage module having instructions stored thereon for configuring the administrator processor to:

receive a request from the user device to establish the emulation session;

establish an electronic communication link between the user device and the emulation server for providing the emulation session to the user device;

retrieve emulation session data based on the received request, the emulation session data comprising at least one of (i) requested session data associated with the emulation session being requested and (ii) session status data retrieved by monitoring one or more emulation sessions being provided by the emulation server;

determine a plurality of emulation session parameters based on the received request, the plurality of emulation session parameters defining one or more conditions required to be satisfied for the requested emulation session to be provided by the emulation server;

determine a session action to be applied at the emulation server, the session action being determined based on the plurality of emulation session parameters and the emulation session data, wherein determining the session action comprises:

determining whether the emulation session data satisfies the plurality of emulation session parameters;

in response to determining the emulation session data satisfies the plurality of emulation session parameters:

determining a status of the requested emulation session based on the emulation session data;

in response to determining the status of the requested emulation session is an emulation requested status, defining the session action to comprise: (i) commencing the requested emulation session and (ii) one or more instructions for providing the emulation session according the plurality of emulation session parameters; in response to determining the status of the requested emulation session is an emulation in progress status, defining the session action to comprise: (i) maintaining the emulation session and (ii) one or more instructions for continuing the emulation session based on at least one emulation session parameter of the plurality of emulation session parameters;

otherwise, indicating the emulation session data fails to satisfy the plurality of emulation session parameters; and control the emulation server in accordance with the session action.

16. The system as defined in claim 15, wherein the plurality of emulation session parameters comprises a plurality of pre-defined statuses of the emulation session, the plurality of pre-defined statuses of the emulation session being stored in a storage module in electronic communication with the at least one server processor and comprising the emulation requested status and the emulation in progress status;

the plurality of emulation session parameters further comprises a plurality of user qualifications to be satisfied before an emulation status indicator is switched from the emulation requested status to the emulation in progress status;

the administrator processor is further configured, after receiving the request from the user device, to:

determine if the plurality of user qualifications is satisfied based on at least one of the received request and the emulation session data; and determine the emulation status indicator indicating the status of the emulation session based on the emulation session data, the status of the emulation session is one of the plurality of pre-defined statuses of the emulation session;

upon receiving the request from the user device to establish the emulation session and prior to determining if the plurality of user qualifications is satisfied, the emulation status indicator is the emulation requested status; and if the plurality of user qualifications is determined to be satisfied, the session action comprises:
  switching the emulation status indicator from the emulation requested status to the emulation in progress status.

17. The system as defined in claim 16, wherein
the request comprises a user identifier for a user of the user device requesting the emulation session;
the plurality of user qualifications comprises a user minimum account amount, the user minimum account amount representing a monetary value; and
the administrator processor is further configured to:
  identify a user account for the user based on the user identifier; and
  determine if an amount of funds stored in the user account is greater than the user minimum account amount.

18. The system as defined in claim 16, wherein
the request comprises a user identifier for a user of the user device requesting the emulation session and a computer product identifier for the computer product being requested to be provided in the emulation session;
the plurality of user qualifications comprises a maximum computer product requirement; and
the administrator processor is further configured to:
  identify a user account for the user based on the user identifier;
  determine a number of identical emulation sessions associated with the user account, the identical emulation sessions being emulation sessions associated with the emulation in progress status and providing the computer product corresponding to the computer product identifier;
  determine if the number of identical emulation sessions is more than the maximum computer product requirement; and
  in response to determining the number of identical emulation sessions is greater than the maximum computer product requirement, define the session action to comprise terminating at least one of the identical emulation sessions so that the number of identical emulation sessions is less than the maximum computer product requirement, otherwise, defining the session action to comprise maintaining the emulation session.

19. The system as defined in claim 16, wherein
the plurality of user qualifications comprises a user device technical capacity requirement, the user device technical capacity requirement identifying one or more resources required for providing the emulation session; and
the administrator processor is further configured, after receiving the request from the user device, to:
  determine a user device technical capacity for the user device based on the emulation session data; and
  determine if the user device technical capacity satisfies the user device technical capacity requirement.

20. The system as defined in claim 16, wherein
the plurality of user qualifications comprises a communication link capacity requirement; and
the administrator processor is further configured, after receiving the request from the user device, to:
  determine a communication link capacity based on the emulation session data; and
  determine if the communication link capacity satisfies the communication link capacity requirement.

21. The system as defined in claim 16, wherein:
the request comprises a user identifier for a user of the user device requesting the emulation session; and
upon determining the plurality of user qualifications is satisfied, the session action further comprises:
  identifying a user account for the user based on the user identifier;
  determining a plurality of user preferences associated with the user account; and
  commencing the emulation session in accordance with the determined plurality of user preferences.

22. The system as defined in claim 15, wherein
the plurality of emulation session parameters comprises a plurality of pre-defined statuses of the emulation session, the plurality of pre-defined statuses of the emulation session being stored in a storage module in electronic communication with the at least one server processor and comprising the emulation requested status and the emulation in progress status;
the plurality of emulation session parameters further comprises a plurality of product license limits, each product license limit in the plurality of product license limits indicates a maximum number of licenses available for each emulation component in the plurality of emulation components;
upon receiving the request from the user device to establish the emulation session and prior to determining a session action to be applied to the emulation server, the emulation status indicator is the emulation requested status; and
the administrator processor is further configured to:
  determine a plurality of emulation components required for providing the computer product;
  determine an emulation status indicator indicating the status of the emulation session based on the emulation session data, the status of the emulation session is one of the plurality of pre-defined statuses of the emulation session;
  for each emulation component, determine a number of license uses indicating a number of emulation sessions using that emulation component and associated with the emulation in progress status; and
  for each emulation component, determine if the number of license uses is less than the product license limit for that emulation component, and if so, defining the session action to comprise commencing the emulation session and switching the emulation status indicator from the emulation requested status to the emulation in progress status, otherwise defining the session action to comprise maintaining the emulation status indicator as the emulation requested status.

23. The system as defined in claim 22, for each emulation component, if the number of license uses is equal to the product license limit, the administrator processor is configured to define the session action to comprise terminating at least one of the emulation sessions using that emulation component so that the number of license uses is less than the product license limit.

24. The system as defined in claim 15, wherein:
the plurality of emulation session parameters comprises a plurality of scaling parameters;
the administrator processor is further configured to:
  determine a display size of the user device; and
  select a scaling parameter from the plurality of scaling parameters based on the determined display size of the user device; and define the session action to comprise scaling a computer product image of the computer product provided in a display of the user device based on the scaling parameter.

25. The system as defined in claim 15, wherein:
the user device comprises a user device storage module;
the plurality of emulation session parameters comprises a preferred memory size threshold indicating a minimum memory size of the user device storage module in order to be used for providing at least a portion of the emulation session;
the administrator processor is further configured to define the session action to comprise:
    determining a user memory size of the user device storage module;
    determining if the user memory size satisfies the preferred memory size threshold;
    commencing the emulation session; and
    if the user memory size is determined to satisfy the preferred memory size threshold, saving least a portion of data associated with the emulation session in the user device storage module.

26. The system as defined in claim 15, wherein
the plurality of emulation session parameters comprises a plurality of pre-defined statuses of the emulation session, the plurality of pre-defined statuses of the emulation session being stored in a storage module in electronic communication with the at least one server processor and comprising the emulation in progress status and the emulation inactive status;
the plurality of emulation session parameters further comprises a user activity requirement;
prior to determining a session action to be applied to the emulation session, the emulation status indicator is the emulation in progress status;
the administrator processor is further configured to:
    determine an emulation status indicator indicating the status of the emulation session based on the emulation session data, the status of the emulation session is one of the plurality of pre-defined statuses of the emulation session;
    determine a user activity indicator based on the emulation session data; and
    determine if the user activity indicator satisfies the user activity requirement, and if so, define the session action to comprise: maintaining the emulation session and retaining the emulation status indicator as the emulation in progress status, otherwise terminating the emulation session by closing the communication link and switching the emulation status indicator from the emulation in progress status to the emulation inactive status.

27. The system as defined in claim 15, wherein
the plurality of emulation session parameters comprises a plurality of pre-defined statuses of the emulation session, the plurality of pre-defined statuses of the emulation session being stored in a storage module in electronic communication with the at least one server processor and comprising the emulation in progress status and the emulation interrupted status;
the plurality of emulation session parameters further comprises a maximum connection loss threshold, the maximum connection loss threshold being a maximum amount of time for which the electronic communication link between the user device and the emulation server is lost before the emulation session is terminated;

prior to determining a session action to be applied to the emulation server, the emulation status indicator is the emulation in progress status;
the administrator processor is further configured to:
    determine an emulation status indicator indicating the status of the emulation session based on the emulation session data, the status of the emulation session is one of the plurality of pre-defined statuses of the emulation session;
    determine a connectivity loss indicator based on the emulation session data, the connectivity loss indicator representing the amount of time for which the electronic communication link between the user device and the emulation server is lost; and
    determine if the connectivity loss indicator satisfies the maximum connection loss threshold, and if so, define the session action to comprise maintaining the emulation session and retaining the emulation status indicator as the emulation in progress status, otherwise terminating the emulation session by closing the communication link and switch the emulation status indicator from the emulation in progress status to the emulation interrupted status.

28. The system as defined in claim 15, wherein the session action comprises at least one of:
    in response to determining the emulation session data fails to satisfy the plurality of emulation session parameters, identifying at least one non-compliant emulation session parameter from the plurality of emulation session parameters and defining the session action based on the at least one non-compliant emulation session parameter, the at least one non-compliant emulation session parameter comprising the one or more conditions not satisfied by the emulation session data;
    determining whether a user minimum account amount is satisfied based on at least one of the received request and the emulation session data, the user minimum account amount representing a monetary value, and defining the session action based on the user minimum account amount;
    determining whether a user memory size satisfies a preferred memory size threshold; and in response to determining the user memory size satisfies the preferred memory size threshold, saving at least a portion of data associated with the emulation session in a user device storage module;
    determining a user device technical capacity for the user device based on the emulation session data, and determining if the user device technical capacity satisfies a user device technical capacity requirement, the user device technical capacity requirement identifying one or more resources required for providing the emulation session; and
    determining a connectivity loss indicator based on the emulation session data, the connectivity loss indicator representing an amount of time for which the electronic communication link between the user device and the emulation server is lost, and determining if the connectivity loss indicator satisfies a maximum connection loss threshold, the maximum connection loss threshold being a maximum amount of time for which the electronic communication link between the user device and the emulation server is lost before the emulation session is terminated.

* * * * *

UNITED STATES PATENT AND TRADEMARK OFFICE
CERTIFICATE OF CORRECTION

PATENT NO. : 9,191,445 B2  
APPLICATION NO. : 13/742632  
DATED : November 17, 2015  
INVENTOR(S) : Morelli, Jr.

Page 1 of 1

It is certified that error appears in the above-identified patent and that said Letters Patent is hereby corrected as shown below:

In the claims

Claim 25, line 20, replace "preferred memory size threshold, saving least a por-" with "preferred memory size threshold, saving at least a por-".

Signed and Sealed this
Twenty-sixth Day of July, 2016

Michelle K. Lee
*Director of the United States Patent and Trademark Office*